United States Patent
Yoon et al.

(10) Patent No.: US 9,595,738 B2
(45) Date of Patent: Mar. 14, 2017

(54) ELECTROLYTE FOR LITHIUM SECONDARY BATTERIES AND LITHIUM SECONDARY BATTERY INCLUDING THE SAME

(71) Applicant: LG Chem, Ltd., Seoul (KR)

(72) Inventors: Yourim Yoon, Daejeon (KR); Jong Mo Jung, Daejeon (KR); Jonghyun Chae, Daejeon (KR); Chul Haeng Lee, Daejeon (KR); Geun Chang Chung, Daejeon (KR); Young Cheol Choi, Daejeon (KR); Young Geun Choi, Daejeon (KR); Seung Jae Yoon, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 14/425,166

(22) PCT Filed: Nov. 22, 2013

(86) PCT No.: PCT/KR2013/010703
§ 371 (c)(1),
(2) Date: Mar. 2, 2015

(87) PCT Pub. No.: WO2014/081249
PCT Pub. Date: May 30, 2014

(65) Prior Publication Data
US 2015/0249267 A1    Sep. 3, 2015

(30) Foreign Application Priority Data

Nov. 22, 2012 (KR) .................. 10-2012-0133285

(51) Int. Cl.
*H01M 10/0567* (2010.01)
*H01M 10/0566* (2010.01)
(Continued)

(52) U.S. Cl.
CPC ....... *H01M 10/0567* (2013.01); *H01M 4/366* (2013.01); *H01M 4/587* (2013.01);
(Continued)

(58) Field of Classification Search
None
See application file for complete search history.

(56) References Cited

U.S. PATENT DOCUMENTS 8,277,981 B2  10/2012  Kim et al.
2002/0012850 A1  1/2002  Schmidt et al.
(Continued)

FOREIGN PATENT DOCUMENTS

JP    2001266938 A    9/2001
JP    2002033127 A    1/2002
(Continued)

OTHER PUBLICATIONS

English translation of KR20120079395 (2012).*
(Continued)

*Primary Examiner* — Yoshitoshi Takeuchi
(74) *Attorney, Agent, or Firm* — Lerner, David, Littenberg, Krumholz & Mentlik, LLP

(57) ABSTRACT

Disclosed is an electrolyte for lithium secondary batteries including a lithium salt and a non-aqueous solvent, in which a silane based material is included in an amount of 0.1 to 20 wt % based on the total weight of the electrolyte, and a lithium secondary battery including the same.

19 Claims, 1 Drawing Sheet

(51) Int. Cl.
*H01M 10/0564* (2010.01)
*H01M 10/056* (2010.01)
*H01M 10/052* (2010.01)
*H01M 4/36* (2006.01)
*H01M 4/58* (2010.01)
*H01M 4/587* (2010.01)
*H01M 4/62* (2006.01)

(52) U.S. Cl.
CPC ......... *H01M 4/5825* (2013.01); *H01M 4/625* (2013.01); *H01M 10/052* (2013.01); *H01M 2220/20* (2013.01); *H01M 2300/0025* (2013.01); *Y02E 60/122* (2013.01); *Y02T 10/7011* (2013.01)

(56) References Cited

U.S. PATENT DOCUMENTS

| | | | |
|---|---|---|---|
| 2005/0089758 A1 | 4/2005 | Kim et al. | |
| 2009/0111029 A1 | 4/2009 | Lee et al. | |
| 2011/0117446 A1* | 5/2011 | Lucht | H01M 10/052 429/332 |
| 2012/0135309 A1 | 5/2012 | Kim | |
| 2012/0183839 A1 | 7/2012 | Yuasa et al. | |
| 2012/0231341 A1 | 9/2012 | Kim et al. | |
| 2012/0321933 A1 | 12/2012 | Kim et al. | |

FOREIGN PATENT DOCUMENTS

| | | | | |
|---|---|---|---|---|
| JP | 2005129533 | A | 5/2005 | |
| JP | 2009054286 | A | 3/2009 | |
| JP | 2009110957 | A | 5/2009 | |
| JP | 2010113850 | A | 5/2010 | |
| JP | 2011504287 | A | 2/2011 | |
| JP | 2011076820 | A | 4/2011 | |
| JP | 2011527090 | A | 10/2011 | |
| JP | 2012114076 | A | 6/2012 | |
| JP | 2012190786 | A | 10/2012 | |
| KR | 100661246 | B1 | 12/2006 | |
| KR | 20090042593 | A | 4/2009 | |
| KR | 20100089805 | A | 8/2010 | |
| KR | 2012-0079395 | * | 7/2012 | ........ H01M 10/0567 |
| KR | 20120079395 | * | 7/2012 | ................ C07F 7/18 |
| KR | 20120079395 | A | 7/2012 | |
| KR | 20120104484 | A | 9/2012 | |

OTHER PUBLICATIONS

English translation of KR 2012-0079395 (2012).*
International Search Report for Application No. PCT/KR2013/010703 dated Jan. 27, 2014.

* cited by examiner

ELECTROLYTE FOR LITHIUM SECONDARY BATTERIES AND LITHIUM SECONDARY BATTERY INCLUDING THE SAME

CROSS-REFERENCE TO RELATED APPLICATION

This application is a national phase entry under 35 U.S.C. §371 of International Application No. PCT/KR2013/010703, filed Nov. 22, 2013, which claims priority to Korean Patent Application No. 10-2012-0133285, filed on Nov. 22, 2012, the disclosures of which are incorporated herein by reference.

TECHNICAL FIELD

The present invention relates to an electrolyte for lithium secondary batteries and a lithium secondary battery including the same. More particularly, the present invention relates to an electrolyte for lithium secondary batteries including a lithium salt and a non-aqueous solvent, in which a silane based material is included in an amount of 0.1 to 20 wt % based on the total weight of the electrolyte, and a lithium secondary battery including the same.

BACKGROUND ART

Demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized. Accordingly, research into secondary batteries, which may meet a variety of requirements, is being actively performed. In particular, there is high demand for lithium secondary batteries having high energy density, high discharge voltage, and output stability.

In particular, lithium secondary batteries used in hybrid electric vehicles must exhibit great output in short time and be used for 10 years or more under harsh conditions of repeated charge and discharge on a daily basis. Therefore, there are inevitable requirements for a lithium secondary battery exhibiting superior stability and output characteristics to existing small-sized lithium secondary batteries.

In connection with this, existing lithium secondary batteries generally use a lithium cobalt composite oxide having a layered structure, as a cathode and a graphite-based material as an anode. However, $LiCoO_2$ has advantages such as superior energy density and high-temperature characteristics while having disadvantages such as poor output characteristics. Due to such disadvantages, high output temporarily required at abrupt driving and rapid accelerating is provided from a battery and thus $LiCoO_2$ is not suitable for use in hybrid electric vehicles (HEV) which require high output. In addition, due to characteristics of a method of preparing $LiNiO_2$, it is difficult to apply $LiNiO_2$ to actual production processes at reasonable cost. Furthermore, lithium manganese oxides such as $LiMnO_2$, $LiMn_2O_4$, and the like exhibit drawbacks such as poor cycle characteristics and the like.

Accordingly, a method of using a lithium transition metal phosphate as a cathode active material is under study. The lithium transition metal phosphate is broadly classified into $Li_xM_2(PO_4)_3$ having a NaSICON structure and $LiMPO_4$ having an olivine structure, and considered as a material having superior stability, when compared with existing $LiCoO_2$.

A carbon-based active material is mainly used as an anode active material. The carbon-based active material has a very low discharge potential of approximately −3 V, and exhibits extremely reversible charge/discharge behavior due to uni-axial orientation of a graphene layer, thereby exhibiting superior electrode cycle life.

Meanwhile, lithium secondary batteries are prepared by disposing a porous polymer separator between an anode and a cathode, and inserting a non-aqueous electrolyte containing a lithium salt such as $LiPF_6$ and the like thereinto. Lithium ions of a cathode active material are released and inserted into a carbon layer of an anode during charging, whereas lithium ions of the carbon layer are released and inserted into a cathode active material during discharging. In this regard, a non-aqueous electrolyte between an anode and a cathode functions as a medium migrating lithium ions. Such lithium secondary batteries must be basically in a range of battery operation voltage and have ability to transfer ions at a sufficiently fast speed.

As the non-aqueous electrolyte, existing carbonate based solvents were used. However, carbonate based solvents have problems such as decreased ionic conductivity due to increased viscosity. In addition, when some compounds are used as additives for an electrolyte, some metrics of battery performance are improved but others may be decreased.

Therefore, concrete research into an electrolyte for lithium secondary batteries exhibiting superior output and lifespan characteristics is required.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, when an electrolyte for lithium secondary batteries including a lithium salt and a non-aqueous solvent, in which a silane based material is included in an amount of 0.1 to 20 wt % based on the total weight of the electrolyte, is used, desired effects may be accomplished, thus completing the present invention.

Technical Solution

In accordance with one aspect of the present invention, provided is an electrolyte for lithium secondary batteries including a lithium salt and a non-aqueous solvent, in which a silane based material is included in an amount of 0.1 to 20 wt % based on the total weight of the electrolyte.

Generally, carbonate solvents has problems such as low ionic conductivity due to high viscosity. On the other hand, the predetermined silane-based material according to the present invention may reduce interface resistance and, thus, a lithium secondary battery including the same may have improved output characteristics at room temperature and at low temperature.

The silane based material may be any one selected from the group consisting of trimethoxysilylpropyl aniline (TMSPA), tetramethylorthosilicate, tetraethylorthosilicate, tetrapropylorthosilicate, tetrabutylorthosilicate and a mixture thereof. The silane based material may be particularly trimethoxysilylpropyl aniline (TMSPA).

In particular, the silane based material may be added in an amount of 0.1 to 10 wt %, preferably in an amount of 0.5 to 8 wt %, more preferably in an amount of 0.5 to 5 wt %, based on the total weight of the electrolyte. When the amount of the silane based material is extremely small, resistance is reduced and, thus, output effects may not be anticipated. On the other hand, when the amount of the silane based material is extremely large, an electrolyte content may be relatively reduced and, thus, total characteristics of a battery may be deteriorated.

The electrolyte may include an ether based solvent. The ether based solvent, for example, may be at least one selected from tetrahydrofuran, 2-methyltetrahydrofuran, dimethyl ether, and dibutyl ether. The ether based solvent may be particularly dimethyl ether.

The electrolyte may additionally include a carbonate based solvent.

In this case, a mixing ratio of the ether based solvent to the carbonate based solvent may be 2:8 to 8:2. When the amount of the carbonate based solvent is extremely large, ionic conductivity of an electrolyte may be undesirably reduced due to a high viscosity of the carbonate based solvent. On the other hand, when the amount of the carbonate based solvent is extremely small, a lithium salt is not easily dissolved in an electrolyte and, thus, an ionic dissociation is undesirably reduced.

The carbonate based solvent, for example, may be cyclic carbonate. The cyclic carbonate may be at least one of ethylene carbonate (EC), propylene carbonate (PC), 1,2-butylene carbonate, 2,3-butylene carbonate, 1,2-pentylene carbonate, and 2,3-pentylene carbonate.

In addition, the carbonate based solvent may additionally include linear carbonate. The linear carbonate includes at least one of dimethyl carbonate (DMC), diethyl carbonate (DEC), dipropyl carbonate (DPC), ethyl methyl carbonate (EMC), methyl propyl carbonate (MPC) and ethyl propyl carbonate (EPC). In this case, a mixing ratio of the cyclic carbonate and the linear carbonate may be 1:4 to 4:1 based on a volumetric ratio of the carbonate based solvent.

The lithium salt may be at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, (CF$_3$SO$_2$)$_2$NLi, chloroborane lithium, lithium tetraphenyl borate, and imides, and the concentration thereof may be 0.5 to 3 M in an electrolyte.

The present invention provides a lithium secondary battery including the electrolyte for lithium secondary batteries.

The lithium secondary battery may include, as a cathode active material, layered compounds such as lithium cobalt oxide (LiCoO$_2$), lithium nickel oxide (LiNiO$_2$) and the like including two transition metals or more and substituted with one transition metal or more, as a lithium transition metal oxide; lithium manganese oxides substituted with one transition metal or more; lithium nickel based oxides represented by Formula LiNi$_{1-y}$M$_y$O$_2$, where M is at least one of Co, Mn, Al, Cu, Fe, Mg, B, Cr, Zn or Ga and $0.01 \leq y \leq 0.7$; lithium nickel cobalt manganese composite oxides represented by Li$_{1+z}$Ni$_b$Mn$_c$Co$_{1-(b+c+d)}$M$_d$O$_{(2-e)}$A$_e$, where $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A is F, P or Cl, such as Li$_{1+z}$Ni$_{1/3}$Co$_{1/3}$Mn$_{1/3}$O$_2$, Li$_{1+z}$Ni$_{0.4}$Mn$_{0.4}$Co$_{0.2}$O$_2$ and the like; Li$_{1+a}$M(PO$_{4-b}$)X$_b$; and the like.

The lithium secondary battery may include
(i) a cathode including a lithium metal phosphate according to Formula 1 below, as a cathode active material; and
(ii) an anode including amorphous carbon, as an anode active material,

$$Li_{1+a}M(PO_{4-b})X_b \tag{1}$$

wherein M is at least one selected from metals of Groups II to XII, X is at least one selected from F, S and N, $-0.5 \leq a \leq +0.5$, and $0 \leq b \leq 0.1$.

In particular, the lithium metal phosphate may be lithium iron phosphate, which has an olivine crystal structure, according to Formula 2 below:

$$Li_{1+a}Fe_{1-x}M'_x(PO_{4-b})X_b \tag{2}$$

wherein M' is at least one selected from Al, Mg, Ni, Co, Mn, Ti, Ga, Cu, V, Nb, Zr, Ce, In, Zn, and Y, X is at least one selected from F, S, and N, $-0.5 \leq a \leq +0.5$, $0 \leq x \leq 0.5$, and $0 \leq b \leq 0.1$.

When values of a, b and x are outside the above ranges, conductivity is reduced or it is impossible to maintain the olivine structure of the lithium iron phosphate. In addition, rate characteristics are deteriorated or capacity may be reduced.

More particularly, the lithium metal phosphate having the olivine crystal structure may be LiFePO$_4$, Li(Fe, Mn)PO$_4$, Li(Fe, Co)PO$_4$, Li(Fe, Ni)PO$_4$, or the like, more particularly LiFePO$_4$.

That is, the lithium secondary battery according to the present invention uses LiFePO$_4$ as a cathode active material and amorphous carbon as an anode active material, and thus internal resistance increase, which causes low electrical conductivity of LiFePO$_4$, may be resolved, and superior high-temperature stability and output characteristics may be exhibited.

In addition, when the predetermined electrolyte according to the present invention is applied together, superior room- and low-temperature output characteristics may be exhibited when compared with the case of using a carbonate solvent.

The lithium-containing phosphate may be composed of first particles and/or second particles in which first particles are physically aggregated.

An average particle diameter of the first particles may be 1 nanometer to 300 nanometers and an average particle diameter of the second particles may be 1 to 40 micrometers. Particularly, an average particle diameter of the first particles may be 10 nanometers to 100 nanometers and an average particle diameter of the second particles may be 2 and 30 micrometers. More particularly, an average particle diameter of the second particles may be 3 to 15 micrometers.

When an average particle diameter of the first particles is excessively large, desired improvement of ionic conductivity may not be exhibited. On the other hand when an average particle diameter of the first particles is excessively small, it is not easy to manufacture a battery. In addition, when an average particle diameter of the second particles is excessively large, bulk density is reduced. On the other hand when an average particle diameter of the second particles is excessively small, a process may not be effectively performed.

A specific surface area (BET) of the second particles may be 3 m$^2$/g to 40 m$^2$/g.

The lithium iron phosphate having an olivine crystal structure may be, for example, covered with conductive carbon to increase electrical conductivity. In this case, the amount of the conductive carbon may be 0.1 wt % to 10 wt %, particularly 1 wt % to 5 wt %, based on a total weight of the cathode active material. When the amount of the conductive carbon is excessively large, the amount of the lithium metal phosphate is relatively reduced, thereby deteriorating total characteristics of a battery. On the other hand excessively small amount of the conductive carbon is undesirable since it is difficult to improve electrical conductivity.

The conductive carbon may be coated over a surface of each of the first particles and the second particles. For example, the conductive carbon may be coated to a thickness of 0.1 to 100 nanometers over surfaces of the first particles and to a thickness of 1 to 300 nanometers over surfaces of the second particles.

When the first particles are coated with 0.5 to 1.5 wt % of the conductive carbon based on a total weight of the cathode active material, a thickness of the carbon coating layer may be approximately 0.1 to 2.0 nanometers.

In the present invention, the amorphous carbon is a carbon-based compound other than crystalline graphite and for example, may be hard carbon and/or soft carbon. When crystalline graphite is used, decomposition of an electrolyte may undesirably occur.

The amorphous carbon may be prepared through a process including thermal-treatment at 1800° C. or less. For example, the hard carbon may be prepared through thermal decomposition of a phenolic resin or a furan resin and the soft carbon may be prepared through carbonization of coke, needle coke, or pitch.

Hereinafter, a composition of the lithium secondary battery according to the present invention will be described.

The lithium secondary battery according to the present invention includes a cathode, which is prepared by coating a mixture of the cathode active material, a conductive material, and a binder on a cathode current collector and drying and pressing the coated cathode current collector, and an anode prepared using the same method as that used to manufacture the cathode. In this case, the mixture may further include a filler as desired.

The cathode current collector is generally fabricated to a thickness of 3 micrometers to 500 micrometers. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 50 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

An anode current collector is typically fabricated to a thickness of 3 micrometers to 500 micrometers. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material. In addition, the anode current collector may be used in various forms including films, sheets, foils, nets, porous structures, foams, and non-woven fabrics.

The lithium secondary battery may have a structure in which an electrode assembly, which includes a cathode, an anode, and a separator disposed between the cathode and the anode, is impregnated with the electrolyte.

The separator is disposed between the cathode and the anode and an insulating thin film having high ion permeability and mechanical strength is used as the separator. The separator typically has a pore diameter of 0.01 micrometers to 10 micrometers and a thickness of 5 micrometers to 300 micrometers. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The lithium salt-containing electrolyte is composed of the non-aqueous organic electrolyte as described above and a lithium salt and additionally may include a non-aqueous organic solvent, an organic solid electrolyte, an inorganic solid electrolyte, and the like, but the present invention is not limited thereto.

Examples of the organic solid electrolyte include polyethylene derivatives, polyethylene oxide derivatives, polypropylene oxide derivatives, phosphoric acid ester polymers, agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, and Li$_3$PO$_4$—Li$_2$S—SiS$_2$.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

The present invention provides a battery module including the lithium secondary battery as a unit cell and a battery pack including the battery module.

The battery pack may be used as a power source for devices that require stability at high temperature, long cycle life, and high rate characteristics.

Examples of the devices include electric vehicles, hybrid electric vehicles (HEVs), plug-in hybrid electric vehicles (PHEVs), and the like, and the secondary battery according to the present invention may be desirably used in hybrid electric vehicles due to superior output characteristics thereof.

Recently, research into use of a lithium secondary battery in power storage devices, in which unused power is converted into physical or chemical energy for storage and when necessary, the converted energy is used as electric energy, is being actively performed.

BRIEF DESCRIPTION OF THE DRAWINGS

The above and other objects, features and other advantages of the present invention will be more clearly understood from the following detailed description taken in conjunction with the accompanying drawing, in which.

MODE FOR INVENTION

Now, the present invention will be described in more detail with reference to the following examples. These examples are provided only for illustration of the present invention and should not be construed as limiting the scope and spirit of the present invention.

EXAMPLE 1

88 wt % of Li(Ni$_{1/3}$Mn$_{1/3}$Co$_{1/3}$)O$_2$/LiMn$_2$O$_4$ (3:7) as a cathode active material, 6.5 wt % of Super-C as a conductive material, and 5.5 wt % of PVdF as a binder were added to NMP to prepare a cathode mixture slurry. The resulting cathode mixture slurry was coated, dried, and pressed over one side of aluminum foil to prepare a cathode.

93.5 wt % of soft carbon/graphite (95:5) as an anode active material, 2 wt % of Super-C as a conductive material, and 3 wt % of SBR as a binder, and 1.5 wt % of CMC as a thickener were added to water, H$_2$O, as a solvent to prepare an anode mixture slurry. The resulting anode mixture slurry was coated, dried, and pressed over one side of copper foil to prepare an anode.

The cathode and the anode were laminated using Celgard™ as a separator to prepare an electrode assembly. Subsequently, to a lithium non-aqueous electrolyte including a solvent of ethyl carbonate:ethyl methyl carbonate:dimethyl carbonate mixed in a volumetric ratio of 3:3:4 and 1 M LiPF$_6$ as lithium salt, trimethoxysilylpropyl aniline (TMSPA) was added in an amount of 1.0 wt % based on the total weight of the electrolyte, resulting in completion of a lithium secondary battery.

COMPARATIVE EXAMPLE 1

A lithium secondary battery was manufactured in the same manner as in Example 1, except that trimethoxysilylpropyl aniline (TMSPA) was not added to the lithium non-aqueous electrolyte.

EXPERIMENTAL EXAMPLE 1

Low temperature output characteristics of the lithium secondary batteries according to Example 1 and Comparative Example 1 were measured at −30° C. Results are illustrated in FIG. 1 below.

Figure 1:
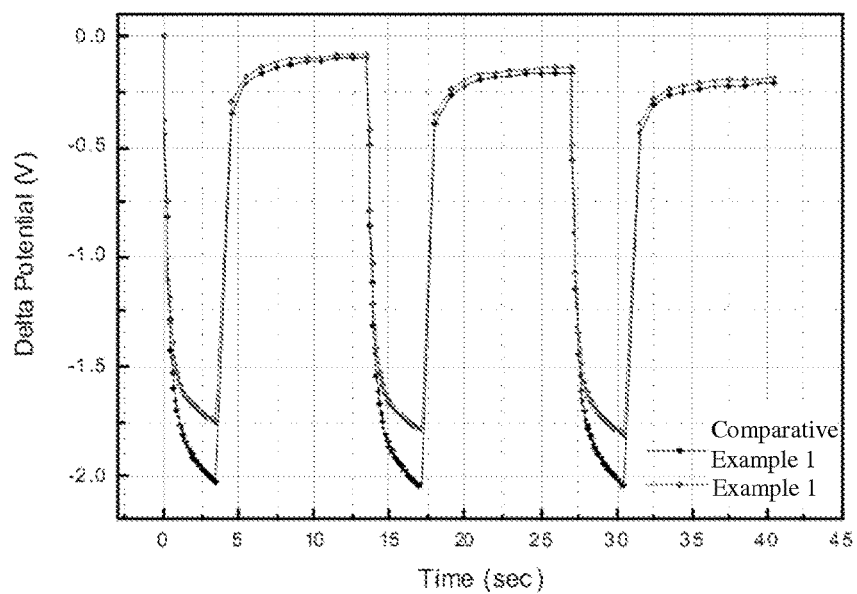
FIG. 1 is a graph illustrating delta voltages of secondary batteries according to Experimental Example 1.

As shown in FIG. 1, the battery according to Example 1 of the present invention exhibits lower delta voltage than the battery according to Comparative Example 1. Therefore, it can be confirmed that, in the case of the battery according to Example 1 of the present invention, cold cranking power is improved and, thus, low-temperature output characteristics are improved.

EXPERIMENTAL EXAMPLE 2

Room-temperature output characteristics of the lithium secondary batteries manufactured according to Example 1 and Comparative Example 1 were measured at 50% SOC. Results are illustrated in FIG. 2.

Figure 2:
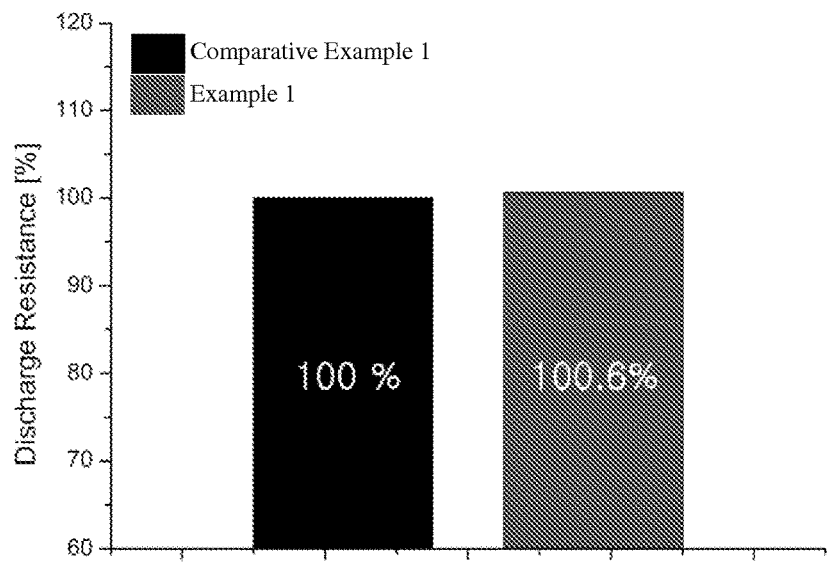
FIG. 2 is a graph illustrating room-temperature output characteristics of secondary batteries according to Experimental Example 2.

As shown in FIG. 2, it can be confirmed that the battery according to Example 1 of the present invention has room-temperature resistance identical to the battery according to Comparative Example 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a secondary battery according to the present invention uses an electrolyte for lithium secondary batteries, to which a silane based material is added in an amount of 0.1 to 20 wt % based on the total weight of the electrolyte and, thus, ionic conductivity is increased, thereby exhibiting superior room- and low-temperature output characteristics and improved high-temperature lifespan.

When the electrolyte is used with lithium iron phosphate having an olivine crystal structure and amorphous carbon, internal resistance of a battery is reduced. Accordingly, lifespan characteristics and output characteristics of the battery are further improved and, thus, the battery may be suitably used for hybrid electric vehicles.

The invention claimed is:

1. An electrolyte for lithium secondary batteries comprising a lithium salt and a non-aqueous solvent, in which a silane based material is comprised in an amount of 0.1 to 20 wt % based on a total weight of the electrolyte,
wherein the silane based material is trimethoxysilylpropyl aniline (TMSPA) or a mixture of the TMSPA and at least one selected from the group consisting of tetramethylorthosilicate, tetraethylorthosilicate, tetrapropylorthosilicate and tetrabutylorthosilicate.

2. The electrolyte for lithium secondary batteries according to claim 1, wherein the silane based material is added in an amount of 0.1 to 10 wt % based on a total weight of the electrolyte.

3. The electrolyte for lithium secondary batteries according to claim 2, wherein the silane based material is added in an amount of 0.5 to 8 wt % based on a total weight of the electrolyte.

4. The electrolyte for lithium secondary batteries according to claim 1, wherein the electrolyte comprises an ether based solvent.

5. The electrolyte for lithium secondary batteries according to claim 4, wherein the ether based solvent is at least one selected from tetrahydrofuran, 2-methyltetrahydrofuran, dimethyl ether, and dibutyl ether.

6. The electrolyte for lithium secondary batteries according to claim 4, wherein the electrolyte additionally comprises a carbonate solvent, and the ether based solvent and carbonate based solvent are mixed in a volumetric ratio of 2:8 to 8:2.

7. The electrolyte for lithium secondary batteries according to claim 6, wherein the carbonate based solvent is a cyclic carbonate, and the cyclic carbonate is at least one of ethylene carbonate (EC), propylene carbonate (PC), 1,2-butylene carbonate, 2,3-butylene carbonate, 1,2-pentylene carbonate, and 2,3-pentylene carbonate.

8. The electrolyte for lithium secondary batteries according to claim 7, wherein the carbonate based solvent additionally comprises a linear carbonate, and the linear carbonate is at least one of dimethyl carbonate (DMC), diethyl carbonate (DEC), dipropyl carbonate (DPC), ethyl methyl carbonate (EMC), methyl propyl carbonate (MPC), and ethyl propyl carbonate (EPC), and the cyclic carbonate and the linear carbonate are mixed in a volumetric ratio of 1:4 to 4:1.

9. The electrolyte for lithium secondary batteries according to claim 1, wherein the lithium salt is at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, (CF$_3$SO$_2$)$_2$NLi, chloroborane lithium, lithium tetraphenyl borate, and imides, and a concentration of the lithium salt in the electrolyte is 0.5 to 3 M.

10. A lithium secondary battery comprising the electrolyte for lithium secondary batteries according to claim 1.

11. The lithium secondary battery according to claim 10, wherein the lithium secondary battery comprises:
a cathode comprising a lithium metal phosphate according to Formula 1 below, as a cathode active material; and
an anode comprising amorphous carbon, as an anode active material, $$\text{Li}_{1+a}\text{M}(\text{PO}_{4-b})\text{X}_b \qquad (1)$$

wherein M is at least one selected from metals of Groups II to XII, X is at least one selected from F, S and N, −0.5≤a≤+0.5, and 0≤b≤0.1.

12. The lithium secondary battery according to claim 11, wherein the lithium metal phosphate is a lithium iron phosphate having an olivine crystal structure according to Formula 2 below:

$$\text{Li}_{1+a}\text{Fe}_{1-x}\text{M}'_x(\text{PO}_{4-b})\text{X}_b \qquad (2)$$

wherein M' is at least one selected from Al, Mg, Ni, Co, Mn, Ti, Ga, Cu, V, Nb,Zr, Ce, In, Zn, and Y,
X is at least one selected from F, S, and N, and
−0.5≤a≤+0.5, 0≤x≤0.5, and 0≤b≤0.1.

13. The lithium secondary battery according to claim 12, wherein the lithium iron phosphate having the olivine crystal structure is LiFePO$_4$.

14. The lithium secondary battery according to claim 13, wherein the lithium iron phosphate having the olivine crystal structure is coated with conductive carbon.

15. The lithium secondary battery according to claim 11, wherein the amorphous carbon is hard carbon and/or soft carbon.

16. A battery module comprising the lithium secondary battery according to claim 10 as a unit cell.

17. A battery pack comprising the battery module according to claim 16.

18. A device comprising the battery pack according to claim 17.

19. The device according to claim 18, wherein the device is a hybrid electric vehicle, a plug-in hybrid electric vehicle, or a system for storing power.

* * * * *